No. 766,639. PATENTED AUG. 2, 1904.
F. C. MASON.
ANTIFRICTION JOURNAL BEARING.
APPLICATION FILED JAN. 16, 1902.
NO MODEL.

Witnesses
Stanley K. McDowell
Mary S. Tooker

Inventor
Francis C. Mason
By Edward Taggart
His Attorney

No. 766,639.

Patented August 2, 1904.

UNITED STATES PATENT OFFICE.

FRANCIS C. MASON, OF GRAND RAPIDS, MICHIGAN, ASSIGNOR TO BISSELL CARPET SWEEPER COMPANY, OF GRAND RAPIDS, MICHIGAN, A CORPORATION.

ANTIFRICTION JOURNAL-BEARING.

SPECIFICATION forming part of Letters Patent No. 766,639, dated August 2, 1904.

Application filed January 16, 1902. Serial No. 90,042. (No model.)

*To all whom it may concern:*

Be it known that I, FRANCIS C. MASON, a citizen of the United States, residing at Grand Rapids, in the county of Kent and State of Michigan, have invented new and useful Improvements in Antifriction Journal-Bearings, of which the following is a specification.

This invention relates to a new and useful improvement in antifriction journal-bearings and adapted for use in carpet-sweepers and other places where a cheap and durable antifriction-bearing is required.

The invention consists in the combination and arrangement of parts hereinafter described and claimed.

The objects of my invention are, first, to produce a cheap and efficient antifriction journal-bearing device peculiarly adapted for small wheels, and especially for carpet-sweeper wheels; second, to construct an antifriction-bearing which can be easily and quickly applied, and, third, to produce an antifriction roller-bearing with suitable mechanism for preventing the access of dust and other foreign substances to the rollers and journal. These objects I accomplish by means of the mechanism illustrated in the accompanying drawings, in which—

Figure 1:
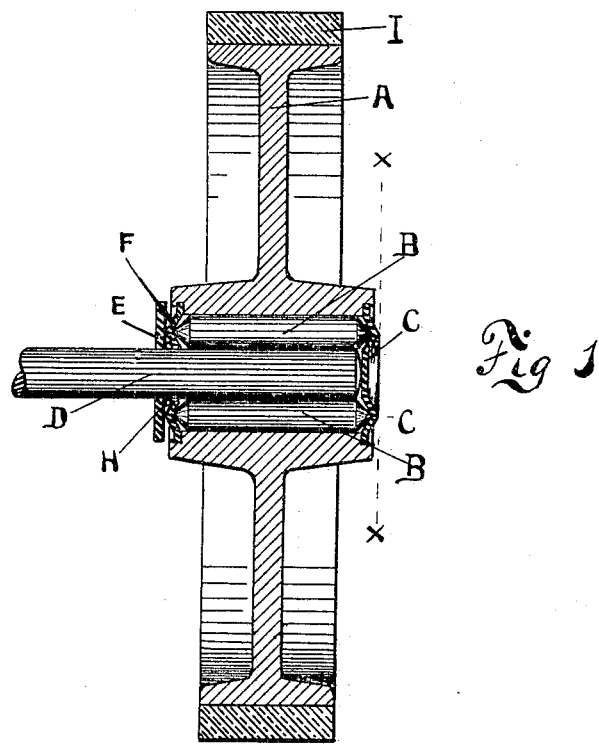
Figure 2:
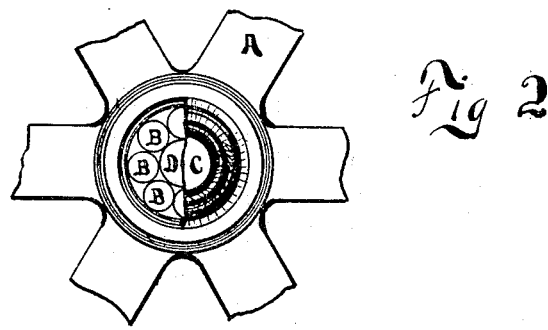

Figure 1 shows a central sectional view of a wheel with the journal in place and two of the rollers shown in place. Fig. 2 shows an end view of a portion of a wheel provided with the imperforate end cap, which is adapted to retain the rollers in place within the hub of the wheel, a portion of the cap being cut away in order to show the position of the end of the journal and also its relative position with reference to the rollers.

Like letters refer to like parts throughout the several views.

A represents a wheel such as is ordinarily used on carpet-sweepers.

B B, &c., represent a series of antifriction-rollers. Each antifriction-roller is provided with a conical part at either end, as shown in Fig. 1.

C is the outer imperforate cap, which cap is provided with an annular groove, preferably V-shaped in cross-section, as shown in said Fig. 1.

C' shows the V-shaped groove. The angle of this V-shaped groove is greater than the angle of the conical portion of the rollers, so that the apex of the conical end of the roller will only touch the apex in this groove.

D is the journal, which has a rounded outer end, so that whenever it comes in contact with the imperforate cap C there will be very little frictional resistance.

F is a perforate cap at the other end of the wheel-hub and serves the purpose of preventing the rollers from dropping out of the wheel-hub at the inner end of the wheel.

E is a washer or collar, preferably made rigid with the journal D.

H is a felt or rubber ring adapted to prevent the dust from passing into the hub.

I is the tire of the wheel, which may be of rubber or any other suitable material.

In the construction of my device as shown in the drawings the wheel A is of iron or other metal and is bored through, so as to leave a space for the reception of the rollers B between the inner surface of such opening and the journal D. The ends of this hub are rimmed out, as shown in Fig. 1, so that the imperforate cap C and perforate cap F may be sunk into the hub, one at either end. The perforate cap F and the imperforate cap C are secured in the same manner.

In constructing the device one of the caps may be inserted in the hub. The rollers may then be dropped into place, the other cap applied, and the wheel is then completed, ready to be shoved onto the journal. If the washer E is made rigid with the roller D, the felt ring H is placed upon the journal in contact with the washer or collar E, and the journal is then passed through the opening of the perforate cap F, and thus into the hub into the position shown in Fig. 1. The space between the imperforate cap C and the perforate cap F is intended to be slightly greater than the length of each roller, so that the rollers will not necessarily touch either of the caps; but if the rollers do touch either of the caps they can only touch them at the apexes of the conical portions of the roller and at the apexes in the V-shaped groove, thus leaving the walls of the grooves of the caps free from the ends of the rollers.

I have described my preferred form of construction, although it will be evident that the imperforate and perforate caps may be applied in any suitable manner without departing from the spirit of the invention.

Having thus described my invention, what I claim to have invented, and desire to secure by Letters Patent, is—

In an antifriction roller-bearing, the combination with a wheel-hub of an imperforate cap arranged within and closing said hub at the outer end thereof, said cap provided with a circular groove at a point slightly removed from the edge thereof, a perforate cap arranged within and closing said hub at the inner end thereof said perforate cap provided with a circular groove at a point slightly removed from the edge thereof, said grooves being V-shaped in cross-section, a journal extending through said perforate cap and abutting against said imperforate cap and antifriction-rollers arranged around said journal and provided with conical ends, the apexes thereof engaging in the apexes of the grooves and the walls of said grooves being free of the ends of the rollers.

In testimony whereof I have hereunto set my hand in presence of two subscribing witnesses.

FRANCIS C. MASON.

Witnesses:
EDWARD TAYGANT,
A. C. DENISON.